United States Patent [19]
Huzenlaub et al.

[11] Patent Number: 5,346,263
[45] Date of Patent: Sep. 13, 1994

[54] FLEXIBLE LINE ELEMENT WITH THERMAL INSULATION

[75] Inventors: Peter Huzenlaub, Dettenheim; Heinz Schmidt, Karlsruhe, both of Fed. Rep. of Germany

[73] Assignee: IWK Regler und Kompensatoren GmbH, Stutensee, Fed. Rep. of Germany

[21] Appl. No.: 927,652

[22] PCT Filed: Mar. 5, 1991

[86] PCT No.: PCT/EP91/00412
§ 371 Date: Sep. 3, 1992
§ 102(e) Date: Sep. 3, 1992

[87] PCT Pub. No.: WO91/14126
PCT Pub. Date: Sep. 19, 1991

[30] Foreign Application Priority Data

Mar. 9, 1990 [DE] Fed. Rep. of Germany ....... 9002752

[51] Int. Cl.$^5$ .............................................. F16L 11/12
[52] U.S. Cl. ........................................ 285/53; 285/226
[58] Field of Search ................... 285/300, 301, 226, 53

[56] References Cited
U.S. PATENT DOCUMENTS 3,997,194 12/1976 Eifer et al. .................... 285/300 X
4,350,372 9/1982 Logsdon ........................ 285/301 X

FOREIGN PATENT DOCUMENTS 8201759 5/1982 PCT Int'l Appl. ................. 285/226
309885 4/1969 Sweden ............................. 285/226
1242986 8/1971 United Kingdom ................ 285/226

Primary Examiner—Dave W. Arola
Attorney, Agent, or Firm—Antonelli, Terry, Stout & Kraus

[57] ABSTRACT

A device for connecting pipelines in a flexible gas-tight manner has a bellows provided at each end with a pipe union which can be connected to a pipeline. The device is characterized in that an insulating cassette in the form of a double tube filled with a temperature-resistant material with excellent heat insulating properties is arranged inside the device.

13 Claims, 1 Drawing Sheet

FLEXIBLE LINE ELEMENT WITH THERMAL INSULATION

FIELD OF THE INVENTION

The invention relates to a device for the flexible, gastight connection of lines, with a bellows, which has at each end a connecting piece connectable to a line, with an insulation formed from a double-layer enveloped, thermo-stable thermal insulating material extending between the connecting pieces.

BACKGROUND OF THE INVENTION

Such flexible line elements are generally inserted in lines as intermediate pieces or adaptors in order to absorb movements and oscillations and bring about decoupling from the passing on to adjacent components. These elements are particularly used in lines carrying hot gases. Temperature change-caused length variations occur, so that these line elements must have a high flexibility and a large tolerance with respect to radial and axial movements.

In order to meet these requirements the bellows forming the gastight connection must have a correspondingly thin-walled construction. However, against this is set the requirement that in the case of hot gas flows the bellows must have an adequate thermal and compression loadability. Thus, the bellows must be dimensioned in such a way that a compromise is found between a good mobility and an adequate thermal and compression loadability. A temperature reduction for decreasing the embrittlement risk is particularly important with nickel-based materials. It has already been proposed to arrange a fibrous layer within the bellows and to force it into the bellows corrugations by stuffing. This leads to a complicated construction, which makes necessary a clasp hose for retaining the insulating material and it is difficult to obtain an adequate thermal insulation.

A device of the aforementioned type is known from GB-A-2 052 665. The latter has a movable tubular connection with a bellows in the form of a shaft. Within the bellows is provided a corrugated insulating hose, whose ends are in each case arranged jointly with the bellows on the connecting pieces. The insulating hose comprises an insulating material layer placed between two textile layers.

It is disadvantageous that in the fixing area at the ends of the insulation, the insulating material is highly compressed by fixing to the bellows and at this point passes a large amount of heat to the bellows. A corrugated insulation cannot be made very thick for deformation reasons, even if this was necessary. The manufacture of the corrugated insulation is complicated and expensive. The corrugated insulation fixed at both sides increases the stiffness of the compensator (increased adjusting forces). A 100% gastight binding of the bellows to the connecting pieces is problematical in conjunction with the interposed insulation. The corrugated insulation has a finite life, because it moves with the bellows.

U.S. Pat. No. 2,937,036 discloses a thermostable pipe coupling between two pipe ends. The pipe ends form an inner telescopic connection and are surrounded by an outer telescopic connection. This comprises outer, telescoped pipe sections, which are arranged by means of ribbed heat radiating elements on in each case one pipe end and have in their insertion area an interposed O-ring for sealing purposes. A glass fibre mat is arranged for thermal insulation purposes between the outer and inner telescopic connection.

The known device has a bellows for the flexible, gastight connection of the pipe ends. The displaceable O-ring used is not absolutely gastight. The thermal insulation is neither placed in the interior, nor is a fixed insulating cassette provided. As the thermal insulation is not in the interior, there is a contact of outer pipe sections with pipe areas, which on the inside are directly subject to the action of a possibly hot medium, so that heat radiating elements are additionally required for insulation. In addition, the device comprises a plurality of parts and is complicated to manufacture.

SUMMARY OF THE INVENTION

The aim underlying the invention is to so further develop a device of the aforementioned type, whilst avoiding the indicated disadvantages, that it has a durable thermal insulation and good thermostability.

According to the present invention, a double tubular insulating cassette filled with the thermal insulating material and extending into the interior of both connecting pieces is provided as the insulation and between the insulating cassette and the connecting pieces is in each case provided a seal, which internally engages in sliding manner on a connecting piece.

In the case of the inventive solution the insulation does not participate in the bellows movement. Thus, the fixed insulating cassette and consequently the insulating material are not deformed and there is a virtually unlimited insulation life and clearly defined insulation characteristics are maintained. Moreover the insulating cassette and the thermal insulation material layer can be made almost randomly thick, so that a desired thermal insulation is obtained as a function of the particular requirements. The seal of the insulating cassette with respect to the connecting pieces ensures that there is no flow through the space between the bellows and the insulating cassette, so as to reduce the thermal loading of the bellows. The inventive insulating cassette can also be subsequently incorporated into a flexible line element.

The insulating cassette can be constructed in one or multi-piece manner. It is particularly interesting that as a result of the multipart nature on the circumference and joint covering with self-adhesive joint sealing strip of ceramic fibres, the cassettes can also be subsequently introduced from the inside into flexible line elements. This leads to a high strength, in that the cassette casing of the insulating cassette is made from austenitic materials and in particular a combination of material 1.1451 as the cassette casing and the internal insulating material in the form of mineral (ceramic) fibres, such as the tangled layer of clay-silicate fibres, as marketed by SEPR Société Européene de Produits Réfractaires, France, designated Kerlane 45, has proved advantageous and a density of 125 to 130 kg/m$^3$ is particularly favourable.

An advantageous construction is obtained in that a seal in the form of a sealing ring is provided and that the seal is preferably a ceramic fibre cord. In this case a good sealing action with adequate flexibility and adequate thermal loadability are obtained. To ensure that the seal does not slip, it is advantageous for it to be fixed to the cassette casing with film or foil strips.

According to a preferred construction the insulating cassette is carried by a protective tube fixed to a connecting piece and extending into the other connecting piece and that the external diameter of the protective tube is smaller than the internal diameter of the connecting pieces, said connecting tube being fixed by means of a joining ring to a connecting piece. These constructions have the advantage that between the protective tube and the bellows an intermediate space through which there is no flow is created and which through the insulating cassette together with the flexible seal brings about a good thermal insulation with respect to the interior of the line, so that the thermal loading of the bellows is much lower and consequently a correspondingly thinner-walled and less expensive bellows construction is possible. It is also possible to reequip old joints with a suitable construction of the insulating cassettes.

An advantageous construction is provided in that the protective tube has at its free end an end ring, so that if the line element is axially stretched the sealing ring cannot slip from the protective tube through the connecting piece moving relative to said protective tube.

BRIEF DESCRIPTION OF THE DRAWINGS

The invention is described in greater detail hereinafter relative to an embodiment and the attached drawings, wherein.

DETAILED DESCRIPTION

Figure 1:
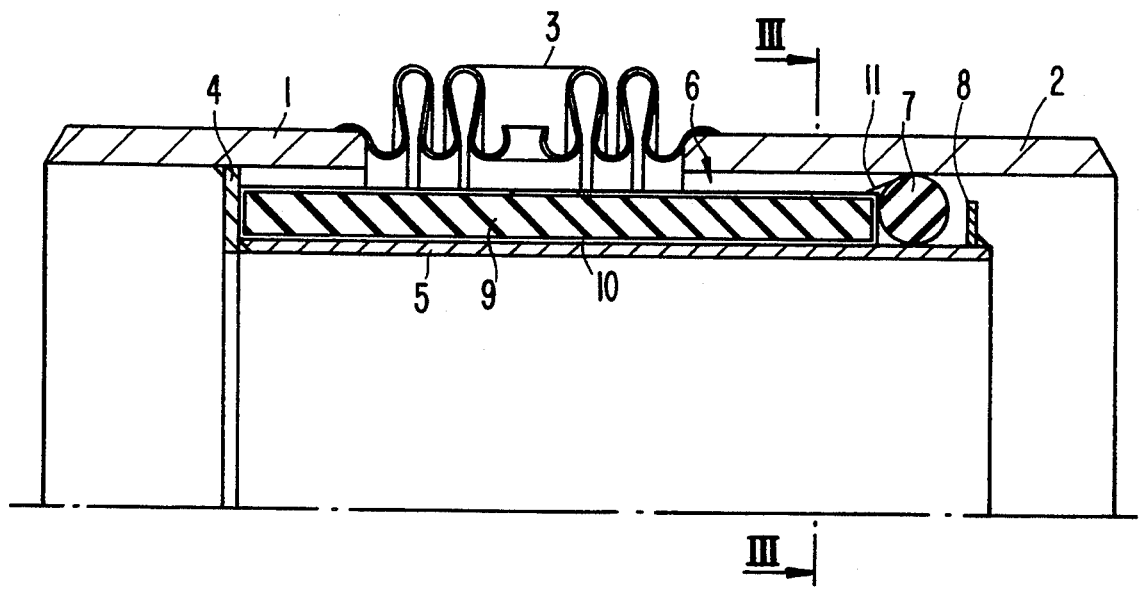
FIG. 1 is a longitudinal section through the line element.

FIG. 1 shows in section the construction according to the invention. The line element comprises two connecting pieces 1, 2, a bellows 3, such as of nickel alloy, e.g. NiCr 22 Mo 9 Nb (material 2.4856) or the like, the protective tube 5 fixed by means of the joining ring 4 to the connecting piece 1 and the insulating cassette 6 with the seal 7. In addition, the protective tube 5 has an end ring 8. The insulating cassette 6 comprises the inner insulating material 9 and the cassette casing 10. The seal 7 is connected to the cassette casing 10 by means of the film or foil 11.

In this construction the connecting pieces 1, 2 are in each case welded to a line and the bellows 3 forms the flexible, gastight connection between the two connecting pieces 1, 2. Through the use of the insulating cassette 6 in conjunction with the seal 7 preferably in the form of a ceramic fibre cord, an effective thermal insulation is obtained. Through the use of the protective tube 10 between the bellows 3 and the insulating cassette 6 a space is formed through which there is no flow, which further reduces the thermal loading when conveying hot media. It has been found that mineral fibres, such as a tangled fibre layer of clay-silicate fibres (Kerlane 45) with a density of 128 kg/m³ have excellent insulating characteristics. The austenitic material 1.4541 has proved advantageous as the cassette casing. To ensure a good insulation, it is advantageous for the insulating cassettes 6 to extend well into both connecting pieces 1, 2. This also makes possible a large stretching area for the bellows 3, but without the latter extending over the seal 7, which still engages internally on the connecting piece 2. So that in the case of such an axial stretching the seal 7 cannot slip from the protective tube 10, the latter has the end ring 8. Roughly every 100 m the seal 7 is fixed over the ring circumference by approximately 0.1 mm thick and approximately 10 mm wide foil strips made from material 1.4541 or the like to the ends or terminal stages of the insulating cassette 6.

Figure 2:
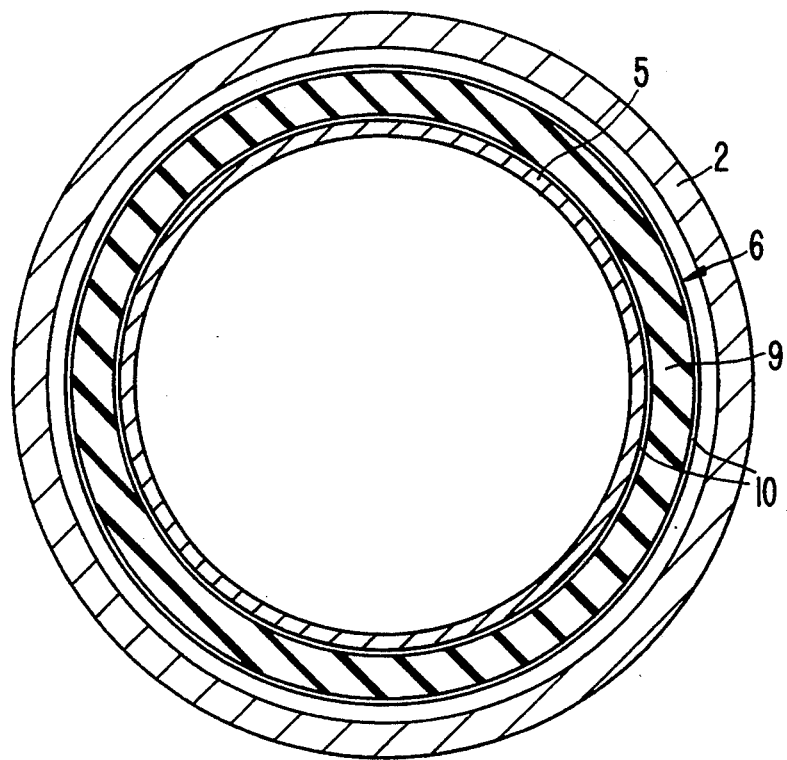
FIG. 2 is a radial section through the line element.

FIG. 2 shows a radial section through the line element, where the connecting piece 2 is visible on the outside. This is followed by an annular cavity, which ensures a movement relative to the angular action of the two connecting pieces 1, 2 against one another. This is followed by the one-piece insulating cassette 6 and at the very inside is located the protective tube 5.

We claim:

1. Device for a flexible gas type connection of pipes, the device including a bellows, and connecting pieces joined to said bellows at opposite ends thereof, said connecting pieces being adapted to be connected to opposed ends of the pipes, and an insulation extending between the connecting pieces, wherein the insulation includes a double tubular insulating cassette of a cassette casing filled with a heat-resistant thermal insulating material, the cassette casing covering the heat-resistant thermal insulation material both on an outer and an inner side thereof, wherein the cassette extends into an interior of both connecting pieces, and means for sealing and for retaining the tubular insulating cassette is gas tight connection to the interior of said connecting pieces, and wherein said means includes a seal provided at least between the insulating cassette and at least one of the connecting pieces, said seal slidingly engaging an inner side of said at least one connecting piece.

2. Device according to claim 1, wherein the cassette includes a ceramic insulating material.

3. Device according to claim 2, wherein the ceramic insulating material includes ceramic fibers.

4. Device according to claim 1, wherein the thermal insulating material, without compression, has a density of 48 to 130 kg/m³ and a compressed density of 96 to 160 kg/m³.

5. Device according to claim 1, wherein the cassette casing of the insulating cassette is made from austenitic material.

6. Device according to claim 1, wherein the cassette casing is made from austenitic material 1.4541.

7. Device according to claim 1, wherein the seal includes a sealing cord.

8. Device according to claim 7, wherein the sealing cord is a ceramic fiber cord.

9. Device according to claim 1, wherein the seal is fixed with foil strips to the cassette casing.

10. Device according to claim 1, wherein said means includes a protective tube and the insulating cassette is carried by said protective tube, said protective tube fixed to one of the connecting pieces and projects through the other connecting piece.

11. Device according to claim 10, wherein an external diameter of the protective tube is smaller than an internal diameter of the connecting pieces.

12. Device according to claim 10, wherein the protective tube is fixed by a joining ring to said one of said connecting pieces.

13. Device according to claim 10, wherein the protective tube includes an end ring at a free end thereof.

* * * * *